US011420734B2

(12) United States Patent
Zhang et al.

(10) Patent No.: US 11,420,734 B2
(45) Date of Patent: Aug. 23, 2022

(54) PROPELLER, PROPELLER KIT, POWER ASSEMBLY, POWER KIT AND UNMANNED AERIAL VEHICLE

(71) Applicant: AUTEL ROBOTICS CO., LTD., Guangdong (CN)

(72) Inventors: Hailang Zhang, Guangdong (CN); Wei Sun, Guangdong (CN); Dongdong Luo, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 106 days.

(21) Appl. No.: 16/915,455

(22) Filed: Jun. 29, 2020

(65) Prior Publication Data

US 2020/0324888 A1    Oct. 15, 2020

Related U.S. Application Data

(63) Continuation of application No. PCT/CN2018/104137, filed on Sep. 5, 2018.

(30) Foreign Application Priority Data

Dec. 29, 2017  (CN) .......................... 201711485898.6

(51) Int. Cl.
*B64C 27/473*      (2006.01)
*B64C 39/02*       (2006.01)
(Continued)

(52) U.S. Cl.
CPC ............ *B64C 27/473* (2013.01); *B64C 11/02* (2013.01); *B64C 39/024* (2013.01); *F01D 5/30* (2013.01);
(Continued)

(58) Field of Classification Search
None
See application file for complete search history.

(56) References Cited

U.S. PATENT DOCUMENTS 9,359,070 B2 *   6/2016  Caubel .................. A63H 27/12
10,435,144 B2 * 10/2019  Zhang ..................... B64C 27/08
(Continued)

FOREIGN PATENT DOCUMENTS

CN          20309440 U       7/2013
CN          105517890 A      4/2016
(Continued)

OTHER PUBLICATIONS

The First Chinese Office Action dated Jun. 21, 2019; Appln. No. 201711485898.6.
(Continued)

*Primary Examiner* — Juan G Flores

(57) ABSTRACT

A propeller, a propeller kit, a power assembly, a power kit and an unmanned aerial vehicle (UAV). The propeller includes a hub and at least two blades connected to the hub. The hub is detachably mounted on a corresponding drive apparatus by a mounting member corresponding to the hub, so that the propeller is mounted on the corresponding drive apparatus. A surface, facing the mounting member, of the hub is provided with a first fitting portion. A surface, facing the hub, of the mounting member is provided with a second fitting portion corresponding to the first fitting portion. The first fitting portion matches the second fitting portion. In the foregoing manner, a user can be prevented from incorrectly mounting a forward propeller and a counter-rotating propeller during the use of a quick-detachable propeller in the embodiments of the present application.

14 Claims, 6 Drawing Sheets

(51) Int. Cl.
*F01D 5/30* (2006.01)
*B64C 11/02* (2006.01)
(52) U.S. Cl.
CPC .. *B64C 2201/027* (2013.01); *B64C 2201/108* (2013.01); *F05D 2220/90* (2013.01)

(56) References Cited

U.S. PATENT DOCUMENTS

| | | | |
|---|---|---|---|
| 2010/0189563 A1 | 7/2010 | Gonzalez Abal | |
| 2015/0129711 A1* | 5/2015 | Caubel | A63H 27/12 |
| | | | 244/17.23 |
| 2017/0305542 A1* | 10/2017 | Zhang | B64C 11/04 |

FOREIGN PATENT DOCUMENTS

| | | |
|---|---|---|
| CN | 205469777 U | 8/2016 |
| CN | 205524936 U | 8/2016 |
| CN | 206407107 U | 8/2017 |
| CN | 108001668 A | 5/2018 |
| CN | 207875976 U | 9/2018 |
| WO | 2017/049607 A1 | 3/2017 |

OTHER PUBLICATIONS

The International Search Report dated Dec. 5, 2018; PCT/CN2018/104137.

\* cited by examiner

PROPELLER, PROPELLER KIT, POWER ASSEMBLY, POWER KIT AND UNMANNED AERIAL VEHICLE

This application is a continuation application of International Application No. PCT/CN2018/104137, filed on Sep. 5, 2018, which claims priority of Chinese Patent Application No. 201711485898.6, filed on Dec. 29, 2017, which is incorporated herein by reference in its entirely.

BACKGROUND

Technical Field

Embodiments of the present application relate to the field of propeller technology, and in particular, to a propeller, a propeller kit, a power assembly, a power kit and an unmanned aerial vehicle (UAV).

Related Art

A propeller is an important component in a power assembly of a UAV and is usually formed by two or more blades distributed with axial symmetry and a hub. The blades are mounted on the hub. The hub is fixedly mounted on a drive apparatus. When the drive apparatus rotates, the hub drives the blades to rotate together to provide the UAV with a lift.

At present, in most UAVs, a propeller is fixedly mounted on a corresponding drive apparatus by a threaded connection. However, when the propeller and the drive apparatus are fixed by a threaded connection, in one aspect, the assembly and disassembly are inconvenient, and in another aspect, propeller falling is likely to occur. Therefore, a quick-detachable propeller is developed.

During the implementation of the present application, the inventor finds that the prior art has at least the following problems: Although it is convenient, safe and reliable to detach a quick-detachable propeller, the quick-detachable propeller is prone to incorrect mounting of a forward propeller and a counter-rotating propeller, making it impossible for a UAV to fly normally.

Therefore, how to prevent a user from incorrectly mounting a forward propeller and a counter-rotating propeller during the use of a quick-detachable propeller is a problem that urgently needs to be resolved at present.

SUMMARY

Embodiments of the present application provide a propeller, a propeller kit, a power assembly, a power kit and a UAV, so that the problem of how to prevent a user from incorrectly mounting a forward propeller and a counter-rotating propeller during the use of a quick-detachable propeller can be resolved.

To resolve the foregoing technical problem, the following technical solutions are adopted in the present application.

According to a first aspect, an embodiment of the present application provides a propeller, including a hub and at least two blades connected to the hub, where the hub is detachably mounted on a corresponding drive apparatus by a mounting member corresponding to the hub, so that the propeller is mounted on the corresponding drive apparatus, a surface, facing the mounting member, of the hub being provided with a first fitting portion, a surface, facing the hub, of the mounting member being provided with a second fitting portion corresponding to the first fitting portion, the first fitting portion matching the second fitting portion.

In some embodiments, one of the first fitting portion and the second fitting portion is a boss and the other is a groove, when the propeller is mounted in the corresponding drive apparatus, the boss being inserted in the groove.

In some embodiments, a clamping member extends from the surface, facing the mounting member, of the hub, the clamping member and the mounting member being connected by a clamping fit.

In some embodiments, when the clamping member and the mounting member are connected by a clamping fit, the boss is inserted in the groove to reserve a space for the clamping fit between the clamping member and the mounting member.

In some embodiments, both the central axis of the boss and the central axis of the groove coincide with the rotational axis of the drive apparatus.

In some embodiments, the boss and the groove fit in shape and fit in size.

In some embodiments, the cross sections of the boss and the groove are both annular.

In some embodiments, the thickness of the boss is equal to the depth of the groove and the outer diameter of the boss is equal to the inner diameter of the groove.

According to a second aspect, an embodiment of the present application provides a propeller kit, including a first propeller and a second propeller, one of the first propeller and the second propeller being a forward propeller, the other being a counter-rotating propeller, where the first propeller includes a first hub and at least two blades connected to the first hub, the first hub being detachably mounted on a first drive apparatus by a first mounting member, a surface, facing the first mounting member, of the first hub being provided with a first fitting portion, a surface, facing the first hub, of the first mounting member being provided with a second fitting portion corresponding to the first fitting portion, the first fitting portion matching the second fitting portion;

the second propeller includes a second hub and at least two blades connected to the second hub, the second hub being detachably mounted on a second drive apparatus by a second mounting member, a surface, facing the second mounting member, of the second hub being provided with a third fitting portion, a surface, facing the second hub, of the second mounting member being provided with a fourth fitting portion corresponding to the third fitting portion, the third fitting portion matching the fourth fitting portion; and the first fitting portion does not match the fourth fitting portion, to prevent the first propeller from being mounted on the second drive apparatus by the second mounting member; and the third fitting portion does not match the second fitting portion, to prevent the second propeller from being mounted on the first drive apparatus by the first mounting member.

In some embodiments, the first fitting portion is a first boss, the second fitting portion is a first groove, the third fitting portion is a second boss and the fourth fitting portion is a second groove, when the first propeller is mounted on the first drive apparatus, the first boss being inserted in the first groove, when the second propeller is mounted on the second drive apparatus, the second boss being inserted in the second groove; or the first fitting portion is a first boss, the second fitting portion is a first groove, the third fitting portion is a second boss and the fourth fitting portion is a second groove, when the first propeller is mounted on the first drive apparatus, the first boss being inserted in the first groove; when the second propeller is mounted on the second drive apparatus, the second boss being inserted in the second groove.

In some embodiments, a first clamping member extends from the surface, facing the first mounting member, of the first hub, the first clamping member and the first mounting member being connected by a clamping fit; and a second clamping member extends from the surface, facing the second mounting member, of the second hub, the second clamping member and the second mounting member being connected by a clamping fit.

In some embodiments, when the first clamping member and the first mounting member are connected by a clamping fit, the first boss is inserted in the first groove to reserve a space for the clamping fit between the first clamping member and the first mounting member; and when the second clamping member and the second mounting member are connected by a clamping fit, the second boss is inserted in the second groove to reserve a space for the clamping fit between the second clamping member and the second mounting member; and when the first clamping member and the second mounting member are connected by a clamping fit, the first fitting portion abuts the fourth fitting portion, to prevent the clamping fit between the first clamping member and the second mounting member; and when the second clamping member and the first mounting member are connected by a clamping fit, the third fitting portion abuts the second fitting portion, to prevent the clamping fit between the second clamping member and the first mounting member.

In some embodiments, both the central axis of the first boss and the central axis of the first groove coincide with the rotational axis of the first drive apparatus and both the central axis of the second boss and the central axis of the second groove coincide with the rotational axis of the second drive apparatus.

In some embodiments, the first boss and the first groove fit in shape and fit in size and the second boss and the second groove fit in shape and fit in size; and the first boss and the second groove do not fit in shape and do not fit in size and the second boss and the first groove do not fit in shape and do not fit in size.

In some embodiments, the cross sections of the first boss, the first groove, the second boss and the second groove are all annular.

In some embodiments, the thickness of the first boss is T1 and the outer diameter is D1; and the depth of the first groove is H1 and the inner diameter is D3; and the depth of the second boss is T2 and the outer diameter is D2; and the depth of the second groove is H2 and the inner diameter is D4, where T1=H1>T2=H2 and D1=D3<D2=D4; or
T1=H1<T2=H2 and D1=D3>D2=D4.

According to a third aspect, an embodiment of the present application provides a power assembly, including: a drive apparatus, a mounting member fixedly mounted on the drive apparatus and the foregoing propeller, where the propeller is detachably mounted on the drive apparatus by the mounting member.

According to a fourth aspect, an embodiment of the present application provides a power kit, including: a first drive apparatus, a second drive apparatus, a first mounting member, a second mounting member and the foregoing propeller kit;

the first mounting member is fixedly mounted on the first drive apparatus, a first propeller being detachably mounted on the first drive apparatus by the first mounting member;

the second mounting member is fixedly mounted on the second drive apparatus, a second propeller being detachably mounted on the second drive apparatus by the second mounting member; and in the first drive apparatus and the second drive apparatus, the rotational direction of the drive apparatus corresponding to a forward propeller is the clockwise direction and the rotational direction of the drive apparatus corresponding to a counter-rotating propeller is the counterclockwise direction.

According to a fifth aspect, an embodiment of the present application provides a UAV, including the foregoing power kit.

The beneficial effects of the embodiments of the present application are as follows: Different from a case in the prior art, in the propeller provided in this embodiment of the present application, the first fitting portion matches the second fitting portion, fitting structures of the first fitting portion and the second fitting portion are separately provided on the propeller and the mounting member corresponding to the propeller, so that first fitting portions and second fitting portions with different shapes and sizes can be conveniently designed for a forward propeller and the mounting member corresponding to the forward propeller and a counter-rotating propeller and the mounting member corresponding to the counter-rotating propeller, the first fitting portion of the forward propeller does not match the second fitting portion of the mounting member corresponding to the counter-rotating propeller and the first fitting portion of the counter-rotating propeller does not match the second fitting portion of the mounting member corresponding to the forward propeller, thereby preventing a user from mounting the forward propeller on the drive apparatus rotating counterclockwise or from mounting the counter-rotating propeller on the drive apparatus rotating clockwise.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

Figure 1:
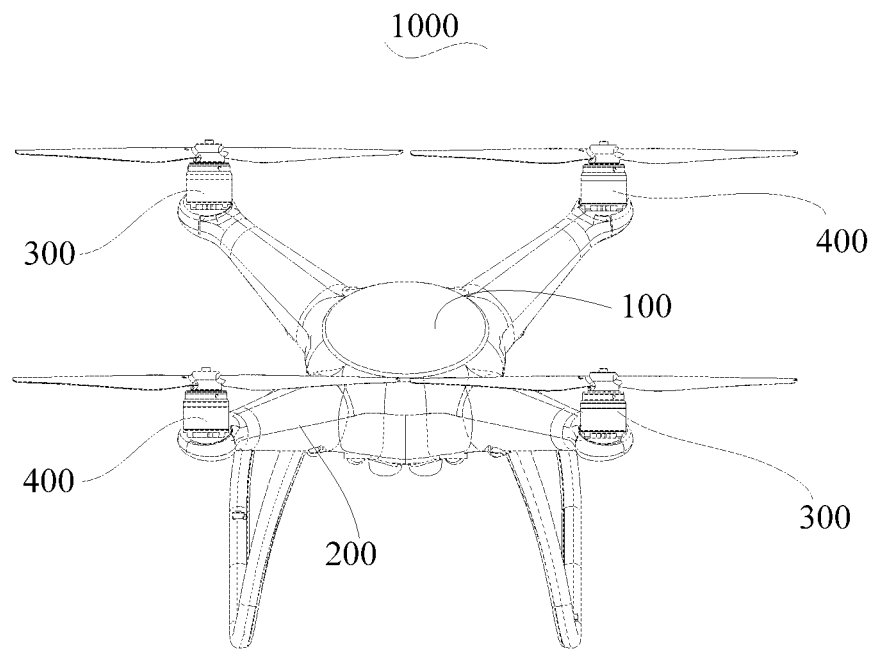
FIG. 1 is a three-dimensional schematic structural diagram of a UAV according to an embodiment of the present application.

For ease of understanding of the present application, the present application is described in detail below with reference to the accompanying drawings and specific embodiments. It should be noted that when an element is "fixed" on another element, the element may be directly fixed on the other element or one or more intervening elements may be present. When an element is "connected" to another element, the element may be directly connected to the other element or one or more intervening elements may be present. The terms "up", "down", "left", "right", "vertical", "horizontal", and similar expressions used in this specification are only used to facilitate description.

Unless otherwise defined, meanings of all technical and scientific terms used in this specification are the same as that usually understood by a person skilled in the technical field to which the present application belongs. Terms used in this specification of the present application are merely intended to describe objectives of the specific embodiments, but are not intended to limit the present application. In addition, the term "and/or" used in this specification includes any or all combinations of one or more related listed items.

A propeller provided in this embodiment of the present application is a quick-detachable propeller. No tool needs to be used to mount the quick-detachable propeller on a drive apparatus. The propeller can be mounted and detached with hands. The propeller specifically includes a hub and at least two blades connected to the hub. The hub is detachably mounted on a corresponding drive apparatus by a mounting member corresponding to the hub, so that the propeller is mounted on the corresponding drive apparatus. In particular, a surface, facing the mounting member, of the hub is provided with a first fitting portion. A surface, facing the hub, of the mounting member is provided with a second fitting portion corresponding to the first fitting portion. The first fitting portion matches the second fitting portion. Therefore, in the propeller provided in this embodiment of the present application and fitting structures of the first fitting portion and the second fitting portion are separately provided on the propeller and the mounting member corresponding to the propeller, so that first fitting portions and second fitting portions with different shapes and sizes can be conveniently designed for a forward propeller and the mounting member corresponding to the forward propeller and a counter-rotating propeller and the mounting member corresponding to the counter-rotating propeller, the first fitting portion of the forward propeller does not match the second fitting portion of the mounting member corresponding to the counter-rotating propeller and the first fitting portion of the counter-rotating propeller does not match the second fitting portion of the mounting member corresponding to the forward propeller, thereby preventing a user from mounting the forward propeller on the drive apparatus rotating counterclockwise or from mounting the counter-rotating propeller on the drive apparatus rotating clockwise.

The propeller provided in this embodiment of the present application is applicable to any type of UAV, for example, a rotary-wing UAV or a tilt-rotor rotary-wing UAV. The rotary-wing UAV includes, but is not limited to, a birotor UAV, a quadrotor UAV or a hexarotor UAV.

Specifically, the propeller, the propeller kit, the power assembly, the power kit and the UAV provided in the embodiments of this specification are described below in detail with reference to the accompanying drawings of this specification.

FIG. 1 is a three-dimensional schematic structural diagram of a UAV according to an embodiment of the present application. A UAV 1000 includes a body 100, four arms 200 extending from the body 100, two first power assemblies 300 and two second power assemblies 400. The two first power assemblies 300 and the two second power assemblies 400 form a power kit of the UAV 1000 and are separately mounted on the four arms 200. In addition, the first power assemblies 300 and the second power assemblies 400 are distributed at intervals.

The body 100 usually includes a control circuit assembly formed by electronic elements such as microcontroller units (MCUs). The control circuit assembly includes a plurality of control modules, for example, a flight control module used for controlling the flight attitude of the UAV 1000, a Beidou module used for navigating the UAV 1000 and a data processing module used for processing environmental information obtained by a related vehicle-mounted device (for example, a photographing apparatus).

The first power assemblies 300 and the second power assemblies 400 are mounted on the arms 200, are used for supplying power to the UAV 1000 and driving the UAV 1000 to fly and adjust the flight attitude. In particular, in this embodiment, the UAV 1000 is a quadrotor UAV. For four drive apparatuses separately arranged at arms of the UAV 1000, two drive apparatuses along a diagonal have the same rotational direction. For example, first drive apparatuses of the two first power assemblies 300 along one diagonal both rotate in the clockwise direction and second drive apparatuses of the two second power assemblies 400 along the other diagonal both rotate in the counterclockwise direction. Alternatively, the first drive apparatuses of the two first power assemblies 300 both rotate in the counterclockwise direction and the second drive apparatuses of the two second power assemblies 400 both rotate in the clockwise direction.

For example, the first drive apparatuses of the two first power assemblies 300 rotate in the counterclockwise direction and the second drive apparatuses of the two second power assemblies 400 rotate in the clockwise direction. The objective of such a design lies in that when the first power assemblies 300 supply power to the UAV 1000, an anti-torque opposite the rotational direction of the first drive apparatuses is formed under the effect of air resistance. That is, a spin torque in the clockwise direction is generated on the UAV 1000. Similarly, when supplying power to the UAV 1000, the second power assemblies 400 generate a spin torque in the counterclockwise direction on the UAV 1000. When the rotational speeds of the two first drive apparatuses of the two first power assemblies 300 and the rotational speeds of the two second drive apparatuses of the two second power assemblies 400 are controlled to be opposite in direction and equal in magnitude, spin torques in different directions on the UAV 1000 can be balanced to prevent the UAV 1000 from spinning, so that the UAV 1000 can fly normally.

It may be understood that in this embodiment of the present application, only a quadrotor UAV is used as an example for detailed description, but is not used to limit the present application. In some other embodiments, the UAV may be alternatively another type of multi-rotor UAV, for example, a birotor UAV or a hexarotor UAV. Correspondingly, power kits corresponding to different types of multi-rotor UAVs may include more or fewer first power assemblies or second power assemblies. For example, a birotor UAV may include only one first power assembly and one second power assembly.

Figure 2:
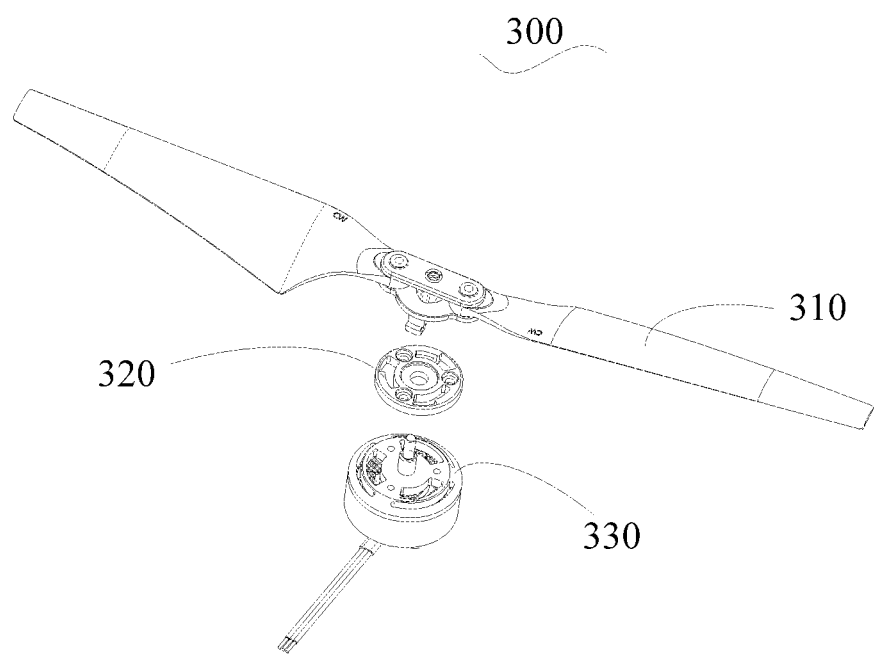
FIG. 2 is a three-dimensional exploded view of a first power assembly of the UAV shown in FIG. 1.

Specifically, referring to FIG. 2, a first power assembly 300 includes a first drive apparatus 330, a first mounting member 320 fixedly mounted on the first drive apparatus 330 and a first propeller 310. The first propeller 310 is detachably mounted on the first drive apparatus 330 by the first mounting member 320. In this embodiment, the rotational direction of the first drive apparatus 330 is the clockwise direction. Therefore, the first propeller 310 is referred to as a forward propeller.

Figure 3:
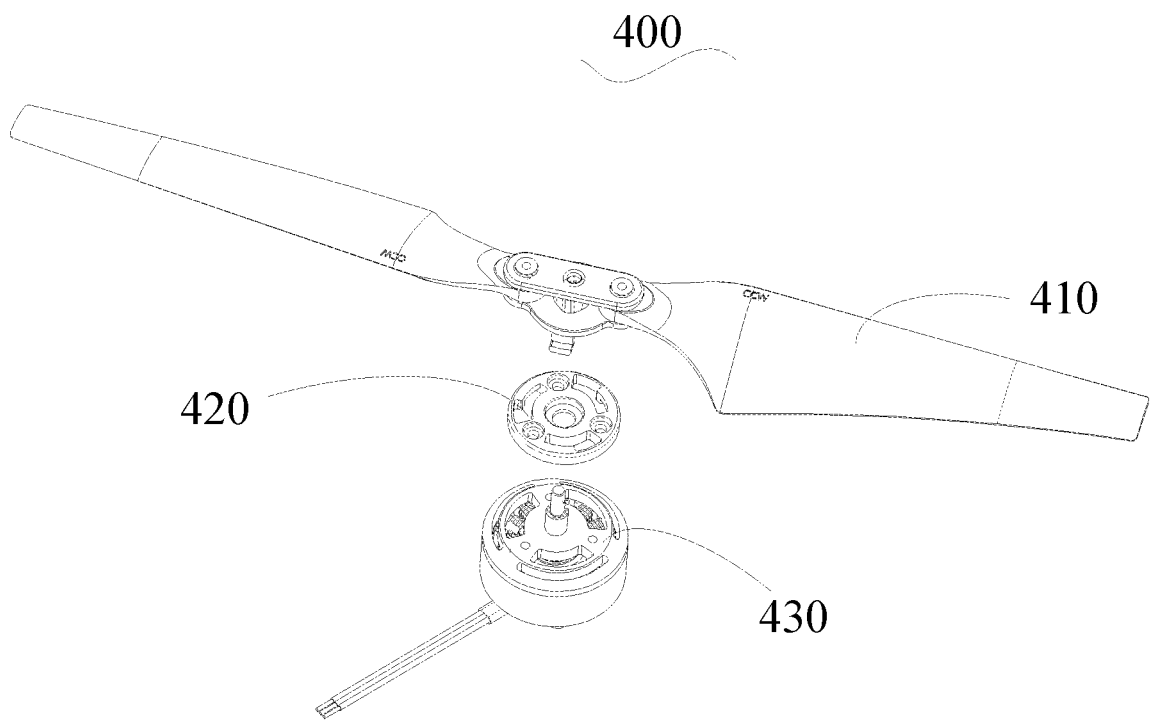
FIG. 3 is a three-dimensional exploded view of a second power assembly of the UAV shown in FIG. 1.

Referring to FIG. 3, a second power assembly 400 includes a second drive apparatus 430, a second mounting member 420 fixedly mounted on the second drive apparatus 430 and a second propeller 410. The second propeller 410 is detachably mounted on the second drive apparatus 430 by the second mounting member 420. In this embodiment, the rotational direction of the second drive apparatus 430 is the counterclockwise direction. Therefore, the second propeller 410 is referred to as a counter-rotating propeller.

It may be understood that in some other embodiments, the rotational direction of the first drive apparatus 330 may be alternatively set to the counterclockwise direction and the rotational direction of the second drive apparatus 430 may be alternatively set to the clockwise direction. The first propeller 310 mounted on the first drive apparatus 330 is a counter-rotating propeller and the second propeller 410 mounted on the second drive apparatus 430 is a forward propeller. This is not specifically limited in this embodiment of the present application, provided that one of the first propeller and the second propeller is a forward propeller and the other is a counter-rotating propeller. In the first drive apparatus and the second drive apparatus, the rotational direction of the drive apparatus corresponding to a forward propeller is the clockwise direction and the rotational direction of the drive apparatus corresponding to a counter-rotating propeller is the counterclockwise direction.

In particular, in this embodiment, as shown in FIG. 2 and FIG. 3, the structures of the first drive apparatus 330 and the second drive apparatus 430 are generally the same, the structures of the first mounting member 320 and the second mounting member 420 are generally the same and the structures of the first propeller 310 and the second propeller 410 are generally the same, so that a user may conveniently adopt the same manner to quickly mount and detach the first power assembly 300 and the second power assembly 400. In addition, to prevent the user from mounting the second propeller 410 on the first drive apparatus 330 (that is, mounting the counter-rotating propeller on the drive apparatus rotating clockwise) or from mounting the first propeller 310 on the second drive apparatus 430 (that is, mounting the forward propeller on the drive apparatus rotating counterclockwise) during the assembly of the first power assembly 300 or the second power assembly 400 of the UAV 1000, which makes it impossible for the UAV 1000 to fly normally, in this embodiment, the first mounting member 320 and the first propeller 310 are correspondingly provided with a pair of first fitting structures (specifically, the first propeller 310 includes a first hub used for mounting the first propeller 310 on the first mounting member 320, a surface, facing the first mounting member 320, of the first hub being provided with a first fitting portion, a surface, facing the first hub, of the first mounting member 320 being provided with a second fitting portion corresponding to the first fitting portion, the first fitting portion matching the second fitting portion). The second mounting member 420 and the second propeller 410 are correspondingly provided with a pair of second fitting structures (specifically, the second propeller 410 includes a second hub used for mounting the second propeller 410 on the second mounting member 420, a surface, facing the second mounting member 420, of the second hub being provided with a third fitting portion, a surface, facing the second hub, of the second mounting member 420 being provided with a fourth fitting portion corresponding to the third fitting portion, the third fitting portion matching the fourth fitting portion). The first fitting structure and the second fitting structure are not compatible with each other (specifically, the first fitting portion does not match the fourth fitting portion and the third fitting portion does not match the second fitting portion). In this way, the second propeller 410 cannot be mounted on the first drive apparatus 330 by the first mounting member 320 and the first propeller 310 cannot be mounted on the second drive apparatus 430 by the second mounting member 420.

In this embodiment, to facilitate batch production and reduce production costs, the first fitting structure and the second fitting structure are generally the same. The difference only lies in that the first fitting structure and the second fitting structure have different sizes or shapes. Therefore, in this embodiment, only the first power assembly 300 and the first propeller 310 are used as an example below for detailed description of the power assembly and the propeller provided in this embodiment of this specification.

Figure 4:
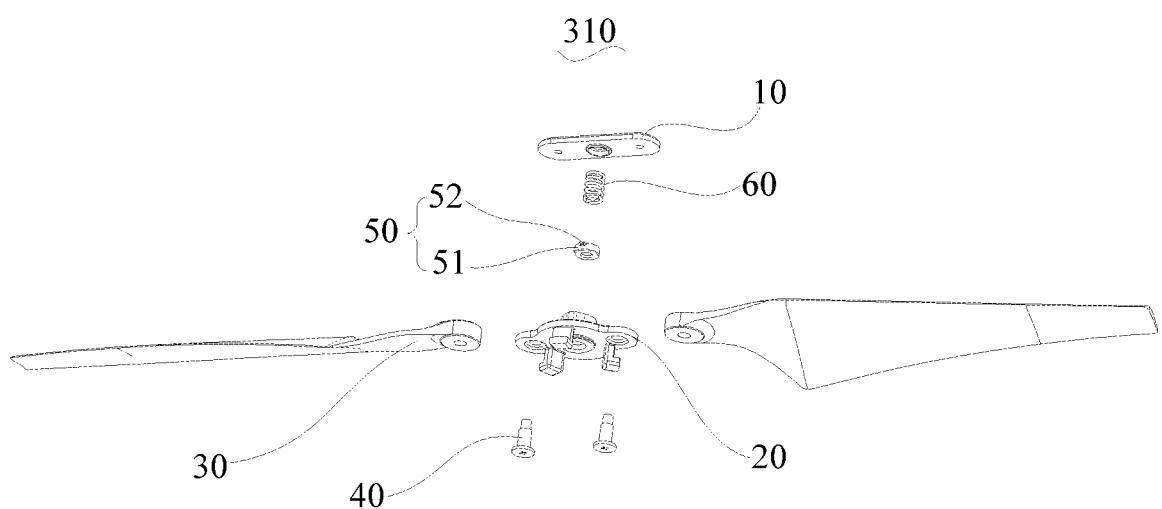
FIG. 4 is a three-dimensional exploded view of a first propeller of the first power assembly shown in FIG. 2.

FIG. 4 is a three-dimensional exploded view of a first propeller of the first power assembly shown in FIG. 2. The first propeller 310 includes a first hub and two blades connected to the first hub. The first hub includes a first blade clamp 10 and a second blade clamp 20. The first blade clamp 10 and the second blade clamp 20 are provided opposite. The central axis of the first blade clamp 10 and the central axis of the second blade clamp 20 both coincide with the rotational axis of the first drive apparatus 330. The first propeller 310 further includes two connecting members 40. Each blade 30 is sandwiched between the first blade clamp 10 and the second blade clamp 20 by one connecting member 40 corresponding to the blade 30. Each blade 30 is rotatable relative to the first blade clamp 10 and the second blade clamp 20. Two blades 30 form a forward propeller structure.

It may be understood that in this embodiment, only the two blades 30 and the two connecting members 40 are used as an example for description, but are not used to limit the embodiments of the present invention. In some other embodiments, more blades 30 and connecting members 40 whose quantity corresponds to that of the blades 30 may be alternatively included.

In addition, it may further be understood that in this embodiment, the first blade clamp 10 and the second blade clamp 20 form the first hub of the first propeller 310. Each blade 30 is mounted on the first hub by a connecting member 40 corresponding to the blade 30. Each blade 30 may rotate relative to the first hub. In some other embodiments, the first hub of the first propeller 310 may be alternatively another structure. For example, the first hub of the first propeller includes a holding portion at a position where at least two blades are correspondingly mounted. The holding portion is pivotally connected to the blade by a connecting member. Alternatively, the first hub of the first propeller may include only one blade clamp body. One end, connected to the blade clamp body, of each blade includes two holding portions provided opposite. The blade clamp body is sandwiched between the two holding portions. Moreover, in still some other embodiments, the at least two blades and the first hub may further be an integrated structure. Each blade is fixedly connected to the first hub. The structure of the first hub and the connection manner between the first hub and the hub are not specifically limited in this embodiment of the present application.

To implement quick assembly and disassembly, the first propeller 310 further includes a slide member 50 and an elastic abutting member 60. The slide member 50 is accommodated between the first blade clamp 10 and the second blade clamp 20. In addition, the slide member 50 is vertically slidable along the central axis between the first blade clamp 10 and the second blade clamp 20. One end of the elastic abutting member 60 abuts the first blade clamp 10 and the other end abuts the slide member 50, to abut the first propeller 310 when the first propeller 310 and the first drive apparatus 330 are rotatably connected, so as to prevent the first propeller 310 from falling off from the first drive apparatus 330. The elastic abutting member 60 may be a spring, an elastic sheet, an elastic ball or the like.

Figure 5A:
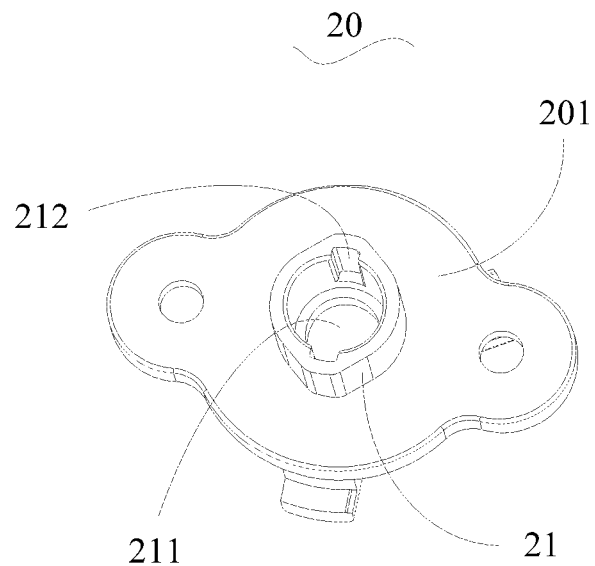
FIG. 5a is a three-dimensional schematic structural diagram of a second blade clamp of a propeller shown in FIG. 4.
Figure 5B:
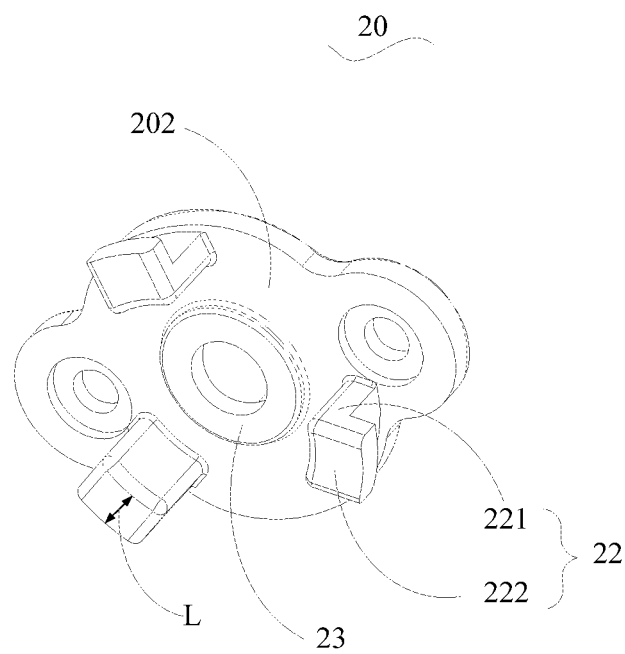
FIG. 5b is a three-dimensional schematic structural diagram of the second blade clamp shown in FIG. 5a from another viewing angle.

Specifically, as shown in FIG. 5a and FIG. 5b, the second blade clamp 20 includes a first surface 201 and a second surface 202. The first surface 201 faces the first blade clamp 10 and the second surface 202 faces the first mounting member 320.

Referring to FIG. 5a, the first surface 201 of the second blade clamp 20 is provided with an accommodating portion 21 used for positioning the elastic abutting member 60 and the slide member 50. The accommodating portion 21 is a hollow cylinder and has a hollow accommodating cavity 211. The slide member 50 and the elastic abutting member 60 are both accommodated in the accommodating cavity 211. In particular, in this embodiment, as shown in FIG. 4, the slide member 50 includes a slide body 51 and a protruding portion 52. The slide body 51 is generally annular and is provided at the center with a through hole used for accommodating a drive shaft 90 of the first drive apparatus 330. The elastic abutting member 60 is sleeved over the drive shaft 90 of the first drive apparatus 330 and abuts a surface, facing the first blade clamp 10, of the slide body 51. The protruding portion 52 of the slide member 50 is arranged on an outer side surface of the slide body 51. Correspondingly, the inner wall of the accommodating cavity 211 is provided along the central axis a notch 212 that corresponds to the protruding portion 52 and matches the protruding portion 52 in shape. The protruding portion 52 of the slide member 50 is inserted in the notch 212, is vertically slidable in the notch 212 and is used for preventing the slide member 50 from rotating relative to the second blade clamp 20, thereby improving the stability of the first propeller 310.

It may be understood that in this embodiment, the slide member 50 further limits the elastic abutting member 60, so that the elastic abutting member 60 provided between the first blade clamp 10 and the second blade clamp 20 is only movable along the central axis of the first blade clamp 10/the second blade clamp 20, thereby improving the stability of the first propeller 310. In some other embodiments, the slide member 50 may be omitted, or the slide member 50 may be replaced with another structure that can limit the elastic abutting member 60.

Moreover, it may further be understood that the elastic abutting member 60 is used for implementing a quick-detach function of the first propeller 310. That is, the abutting function of the elastic abutting member 60 prevents the first propeller 310 from falling off from the first drive apparatus 330. In this embodiment, the elastic abutting member 60 is provided to be accommodated in the first propeller 310. In some other embodiments, the elastic abutting member 60 may be provided to be accommodated in the first drive apparatus 330.

Referring to FIG. 5b, the second surface 202 (that is, the surface, facing the first mounting member, of the first hub) of the second blade clamp 20 extends to form a first clamping member 22 used for quickly mounting the first propeller 310 on the first mounting member 320. The first clamping member 22 and the first mounting member 320 are connected by a clamping fit. Specifically, the quantity of the first clamping members 22 may include, but is not limited to, 1, 2, 3 or 5. When there are N first clamping members 22, the N first clamping members 22 may be evenly distributed on the second surface 202 of the second blade clamp 20 according to an angle of 360°/N. In this embodiment, three first clamping members 22 are adopted. The three first clamping members 22 are evenly distributed on the second surface 202 of the second blade clamp 20 according to an angle of 120°. Each first clamping member 22 has a hook form and includes a connecting portion 221 extending from the second surface 202 of the second blade clamp 20 and a fastening portion 222 formed at a tail end of the connecting portion 221. In particular, to improve the stability of the connection between the first propeller 310 and the first drive apparatus 330, the thickness or mean thickness of the fastening portion 222 of the first clamping member 22 is at least 1.2 millimeters and the height or even height of the first clamping member 22 is at least 3.0 millimeters.

In addition, referring to FIG. 5b again, a first boss 23 further extends from the second surface 202 of the second blade clamp 20. The cross section (the cross section is perpendicular to the central axis thereof) of the first boss 23 is annular. The first boss 23 and the drive shaft 90 of the first drive apparatus 330 are coaxially provided. To prevent a user from incorrectly mounting a forward propeller and a counter-rotating propeller during the use of the UAV, the thickness of the first boss 23 of the first propeller 310 may be set to T1 and the outer diameter may be set to D1.

It may be understood that in this embodiment, the cross section of the first boss 23 is set to be annular. The first boss 23 and the drive shaft 90 of the first drive apparatus 330 are coaxially provided (that is, the central axis of the first boss 23 coincides with the rotational axis of the first drive apparatus 330). The main reason is that the first propeller 310 is connected to the first mounting member 320 by the first clamping member 22 in a rotatable clamping manner and the first boss 23 needs to be rotatable together with the first propeller 310. In some other implementations, when the first propeller 310 is detachably connected to the first mounting member 320 in another manner, the first boss 23 may be alternatively any other suitable shape such as a rectangle, a triangle, a rhombus, and/or, the first boss 23 may be alternatively provided at another suitable position of the second surface 202. This is not specifically limited in this embodiment of the present application.

Moreover, it may further be understood that in this embodiment, the second surface 202 of the second blade clamp 20 extends to form the first boss 23 mainly for the purpose that first fitting structures used for preventing incorrect insertion are provided on the surface, facing the first mounting member 320, of the first propeller 310 and a surface, facing the first propeller 310, of the first mounting member 320. The size or shape of the fitting structure may be finely adjusted to prevent incorrect insertion of the forward propeller and the counter-rotating propeller. In addition, in this embodiment, through the fitting between the first boss 23 and a first groove 73, the first propeller 310 may be seamlessly connected to the first mounting member 320, to reduce the height of the first power assembly 300, making the structure of the first power assembly 300 more compact. In some other embodiments, the first groove may be provided in the second surface 202 of the second blade clamp 20. The first boss is provided on a surface, facing the second blade clamp 20, of the first mounting member 320. Alternatively, another suitable fitting structure may further be used to replace the first boss and the first groove.

During actual application, during the assembly of the first propeller 310, the slide member 50 may first be accommodated in the accommodating portion 21 of the second blade clamp 20. One end of the elastic abutting member 60 is then fixed in the middle of the first blade clamp 10. The other end is accommodated in the accommodating portion 21 of the second blade clamp 20 and abuts a surface, facing the first blade clamp 10, of the slide member 50. Finally, the two connecting members 40 are separately connected to two ends of the first blade clamp 10 and the second blade clamp 20. The two blades 30 are sandwiched between the first blade clamp 10 and the second blade clamp 20. The blade types of the two blades 30 of the first propeller 310 are designed into a structure applicable to the forward propeller.

In this embodiment, the second propeller 410 and the first propeller 420 have generally the same structural features. For example, in this embodiment, the second propeller 410 includes a second hub and two blades connected to the second hub. The second hub is used for being detachably mounted on the second propeller 410 by the second mounting member 420. The surface, facing the second mounting member 420, of the second hub is provided with a third fitting portion used for preventing incorrect insertion of a forward propeller and a counter-rotating propeller. Specifically, in this embodiment, the third fitting portion is a second boss. The cross section (the cross section is perpendicular to the central axis of the second boss) of the second boss is annular. The central axis of the second boss coincides with the rotational axis of the second drive apparatus. In addition, a second clamping member further extends from the surface, facing the second mounting member, of the second hub. The second clamping member and the second mounting member are connected by a clamping fit.

In particular, in this embodiment, for the differences between the second propeller 410 and the first propeller 410, in one aspect, the blade type of the blade of the second propeller 410 is designed to be applicable to a counter-rotating propeller structure. In another aspect, the third fitting portion of the second propeller 410 and the first fitting portion of the first propeller 310 have different shapes and/or sizes. For example, the thickness of the second boss used for preventing incorrect insertion of a forward propeller and a counter-rotating propeller in the second propeller 410 is T2 and the outer diameter is D2. The thickness of the first boss 23 used for preventing incorrect insertion of a forward propeller and a counter-rotating propeller in the first propeller 310 is T1 and the outer diameter is D 1. The relationships between T2 and T1 and between D2 and D1 satisfy: T1<T2, and D1>D2 (or, in some other embodiments, the relationships between T1 and T2 and between D1 and D2 may also satisfy: T1>T2, and D1<D2).

Therefore, it may be understood that in addition to different features in the foregoing two aspects, other structural features and assembly manners in the first propeller 310 are all applicable to the second propeller 410. The replaceable structures described in the first propeller 310 are also applicable to the second propeller 410. Details are not described one by one herein.

Figure 6A:
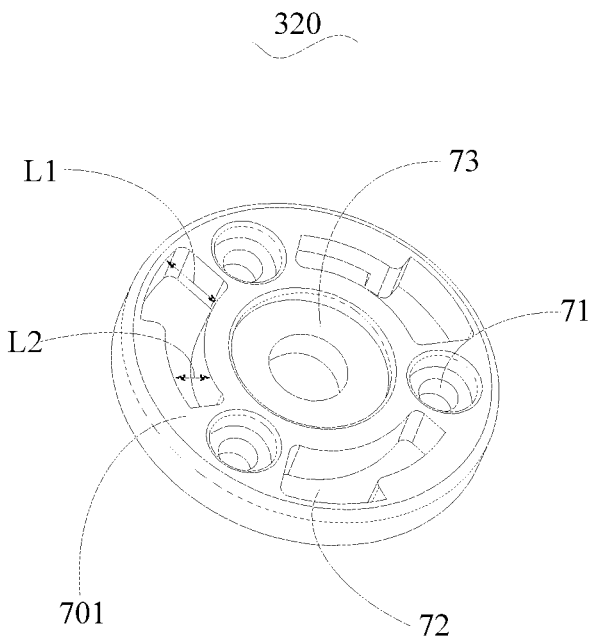
FIG. 6a is a three-dimensional schematic structural diagram of a first mounting member of the first power assembly shown in FIG. 2.
Figure 6B:
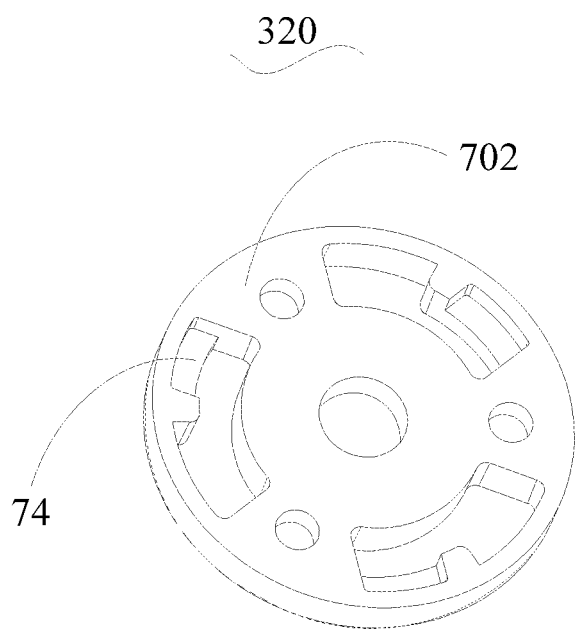
FIG. 6b is a three-dimensional schematic structural diagram of the first mounting member shown in FIG. 6a from another viewing angle.

FIG. 6a and FIG. 6b are three-dimensional schematic structural diagrams of a first mounting member of the first power assembly shown in FIG. 2 from different angles. As shown in FIG. 6a and FIG. 6b, the first mounting member 320 is annular and includes an upper end surface 701 facing the first hub of the first propeller 310 and a lower end surface 702 connected to the first drive apparatus 330. The first mounting member 320 is provided with a plurality of mounting holes 71 used for fixedly mounting the first mounting member 320 on the first drive apparatus 330.

Specifically, as shown in FIG. 6a, the first mounting member 320 is provided with a central hole for mounting the drive shaft 90 of the first drive apparatus 330. The first mounting member 320 is provided with a first stroke groove 72 at the position of the first clamping member 22 corresponding to the first propeller 310. The first stroke groove 72 is annular. The center of circle of the annular first stroke groove 72 is at the center of the central hole. The first stroke groove 72 passes through the upper end surface 701 and the lower end surface 702. The shape of the cross section of the first stroke groove 72 is rectangular. The cross-sectional area of one end of the first stroke groove 72 is greater than that at the other end thereof. In addition, the length L1 of the cross section at one end thereof is greater than the width L of the fastening portion 222 of the first clamping member 22 of the first propeller 310. The length L2 of the cross section of the other end thereof is less than the width L of the fastening portion 222. Therefore, under the effect of an external force, the first clamping member 22 of the first propeller 310 may be inserted in the first stroke groove 72 from the end with the large cross-sectional area of the first stroke groove 72 and slides toward the end with the small cross-sectional area along the first stroke groove 72. When the first clamping member 22 slides to the end with the small cross-sectional area in the first stroke groove 72, if the external force is removed, the first propeller 310 moves away from the first mounting member 320 under the effect of the elastic abutting member 60 of the first propeller 310 until the fastening portion 222 of the first clamping member 22 abuts the lower end surface 702 of the first mounting member 320, so that the first clamping member 22 of the first propeller 310 may be connected to the first mounting member 320 by a clamping fit.

Further, in this embodiment, as shown in FIG. 6a, the lower end surface 702 of the first mounting member 320 is concave inward to form a clamping groove 74. The clamping groove 74 is provided at the end with the small cross-sectional area of the first stroke groove 72. One side of the clamping groove 74 is in communication with the first stroke groove 72. When the first propeller 310 moves away from the first mounting member 320 under the effect of the elastic abutting member 60 of the first propeller 310, the fastening portion 222 of the first clamping member 22 may be clamped in the clamping groove 74, so as to reduce the space occupied by the fastening portion 222, so that the first power assembly is more compact. In addition, the left and right sides of the fastening portion 222 are fixed to prevent the fastening portion 222 from rotating to the left or right, thereby improving the mounting stability. Certainly, it may be understood that in some other embodiments, in consideration of the factor of costs, the clamping groove 74 may also be omitted, to increase the frictional force at the abutting position between the fastening portion 222 and the first mounting member 320.

In particular, in this embodiment, as shown in FIG. 6b, the upper end surface 701 of the first mounting member 320 is provided at a position corresponding to the first boss 23 of the first propeller 310 with a first groove 73 used for preventing incorrect insertion. The first groove 73 and the first boss 23 fit in shape and fit in size. The cross section of the first groove 73 is also annular. The central axis of the first groove 73 also coincides with the rotational axis of the first drive apparatus. When the first clamping member 22 and the first mounting member 320 are connected in a clamping fit, the first boss 23 is inserted in the first groove 73 (that is, the first boss 23 is joined to the first groove 73, the first boss 23 being completely accommodated in the first groove 73), so that a space can be reserved for the clamping fit between the first clamping member 22 and the first mounting member 320 (that is, the fastening portion 222 of the first clamping member 22 can completely extend into the first stroke groove 72). In this embodiment, it may be set that the depth H1 of the first groove 73 is equal to the thickness T1 of the first boss 23 and the inner diameter D3 of the first groove 73 is equal to the outer diameter D1 of the first boss 23.

Similarly, in this embodiment, the second mounting member 420 and the first mounting member 320 also have generally the same structural features. For example, in this embodiment, the surface, facing the second hub, of the second mounting member 420 is provided with a fourth fitting portion corresponding to the third fitting portion and the fourth fitting portion matches the third fitting portion. Specifically, in this embodiment, the fourth fitting portion is a second groove. The second groove and the second boss fit in shape and fit in size. The cross section (the cross section is perpendicular to the central axis of the second groove) of the second groove is also annular. The central axis of the second groove also coincides with the rotational axis of the second drive apparatus. In this embodiment, it may also be set that the depth H2 of the second groove is equal to the thickness T2 of the second boss. The inner diameter D4 of the second groove is equal to the outer diameter D2 of the second boss. In addition, the second mounting member is further provided with a second stroke groove connected to the second clamping member by a clamping fit. The second stroke groove and the first stroke groove 72 have the same structural features. When the second clamping member is connected to the second mounting member by a clamping fit to mount the second propeller 410 on the second drive apparatus 430, the second boss is inserted in the second groove (that is, the second boss is joined to the second groove, the second boss being completely accommodated in the second groove), so that a space can be reserved for the clamping fit between the second clamping member and the second mounting member 420 (that is, the fastening portion of the second clamping member can completely extend into the second stroke groove).

In particular, in this embodiment, the differences between the second mounting member 420 and the first mounting member 320 only lie in that the fourth fitting portion (for example, the second groove) in the second mounting member 420 and the second fitting portion in the first mounting member 320 have different shapes or sizes and the first fitting portion does not match the fourth fitting portion (for example, the first boss and the second groove do not match in shape and/or do not match in size), so that the first propeller 310 cannot be mounted on the second drive apparatus 430 by the second mounting member 420. In addition, the third fitting portion does not match the second fitting portion (for example, the second boss and the first groove do not match in shape and/or do not match in size), so that the second propeller 410 cannot be mounted on the first drive apparatus 330 by the first mounting member 320.

For example, in this embodiment, the depth H2 of the second groove is equal to the thickness T2 of the second boss and the inner diameter D4 of the second groove is equal to the outer diameter D2 of the second boss. Further, as described above, the relationships between T1 and T2 and between D1 and D2 satisfy: T1<T2, D1>D2 or T1>T2, D1<D2. It may therefore obtained that:
 T1=H1<T2=H2 and D1=D3>D2=D4; or
 T1=H1>T2=H2 and D1=D3<D2=D4.

Therefore, for example, T1=H1<T2=H2 and D1=D3>D2=D4. When the second propeller 410 is mounted on the first mounting member 320 (that is, the second clamping member is connected to the first mounting member 320 by a clamping fit), because the thickness T2 of the second boss is greater than the depth H1 of the first groove 73, the second boss abuts the first groove (in other words, the second boss cannot be completely accommodated in the first groove), a height difference between T2 and H1 makes it impossible for the second clamping member of the second propeller 410 to completely extend into the first stroke groove 72 of the first mounting member 320, to prevent the clamping fit between the second clamping member and the first mounting member 320. Conversely, when the first propeller 310 is mounted on the second mounting member 420 (that is, the first clamping member is connected to the second mounting member 420 by a clamping fit), because the outer diameter D1 of the first boss 23 is greater than the inner diameter D4 of the second groove, the first boss 23 cannot be inserted into the second groove (that is, the first boss 23 cannot be completely joined to and fit the second groove), so that a height difference T1 generated by the first boss 23 makes it impossible for the first clamping member 22 of the first propeller 310 to completely extend into the second stroke groove of the second mounting member 420, to prevent the clamping fit between the first clamping member and the second mounting member 420. In the foregoing manner, the phenomenon of incorrectly inserting a forward propeller and a counter-rotating propeller can be avoided.

It may be understood that the foregoing size designs such as "T1=H1<T2=H2 and D1=D3>D2=D4" and "T1=H1>T2=H2 and D1=D3<D2=D4" are only exemplary description, but are not used to limit the embodiments of this specification. During actual application, it is only necessary to ensure that the first boss matches the first groove but does not match the second groove and the second boss matches the second groove but does not match the first groove.

It may be understood that in this embodiment, it is only exemplary description that different sizes of the first boss (the first groove) and the second boss (the second groove) are used to distinguish between the first fitting structure between the first propeller 310 and the first mounting member 320 and the second fitting structure between the second propeller 410 and the second mounting member 420. In some other embodiments, different shapes of the first boss (the first groove) and the second boss (the second groove) may be alternatively used to distinguish between the first fitting structure between the first propeller 310 and the first mounting member 320 and the second fitting structure between the second propeller 410 and the second mounting member 420. For example, it may be set that the profile of the first boss and the first groove is a cylinder, the profile of the second boss and the second groove is a cube and the volume of the cube is equal to that of the cylinder.

It may further be understood that in this embodiment, the first groove 73 is provided in the first mounting member 320 (or the second groove is provided in the second mounting member) to form a fitting structure with the first boss 23 provided on the first propeller 310 (or the second boss provided on the second propeller 410), to prevent incorrect insertion of a forward propeller and a counter-rotating propeller. In some other embodiments, another fitting structure for preventing incorrect insertion may be adopted, provided that the first fitting portion provided on the first propeller 310 matches the second fitting portion provided on the first mounting member 320, the third fitting portion provided on the second propeller 410 matches the fourth fitting portion provided on the second mounting member 420, the first fitting portion does not match the fourth fitting portion and the third fitting portion does not match the second fitting portion.

Figure 7:
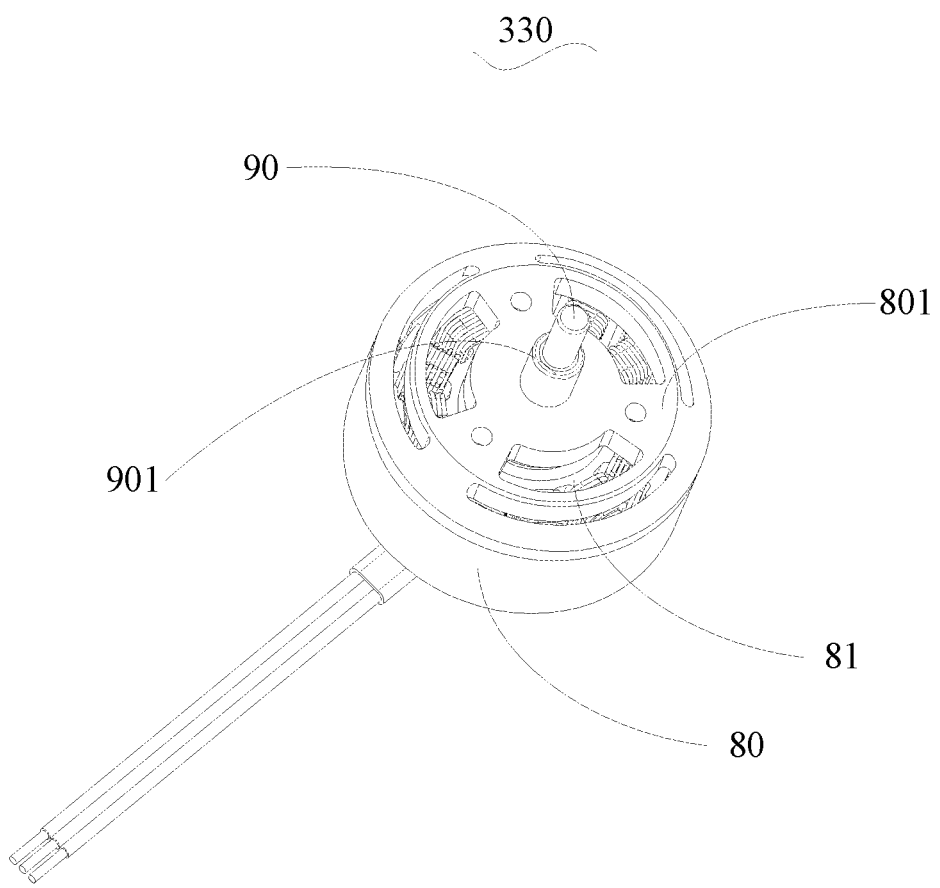
FIG. 7 is a three-dimensional schematic structural diagram of a first drive apparatus of the first power assembly shown in FIG. 2.

FIG. 7 is a three-dimensional schematic structural diagram of a first drive apparatus of the first power assembly shown in FIG. 2. The first drive apparatus 330 includes a drive apparatus body 80 and a drive shaft 90 provided on the drive apparatus body 80. The drive shaft 90 and the drive apparatus body 80 are rotatable relative to each other. The rotational direction of the first drive apparatus 330 is the clockwise direction.

The drive apparatus body 80 is provided with a support surface 801. The first mounting member 320 is mounted on the support surface 801. The first propeller 310 is mounted on the support surface 801 by the first mounting member 320 to be detachably mounted on the first drive apparatus 330. In particular, in this embodiment, the support surface 801 is also provided with an arc-shaped first slide groove 81 at the position corresponding to the first stroke groove 72 of the first mounting member 320. The cross section of the first slide groove 81 is also rectangular. The size of the first slide groove 81 is consistent with that of the end with the relatively large cross-sectional area of the first stroke groove 72. Under the effect of an external force, the fastening portion 222 of the first clamping member 22 of the first propeller 310 may extend into the first slide groove 81 and is slidable in the first slide groove 81. It may be understood that in some embodiments, if the rotational direction of the first drive apparatus 330 is not changeable, the support surface 801 may also be omitted. Instead, the first mounting member 320 is used as the support surface of the first drive apparatus 330.

Figure 8:
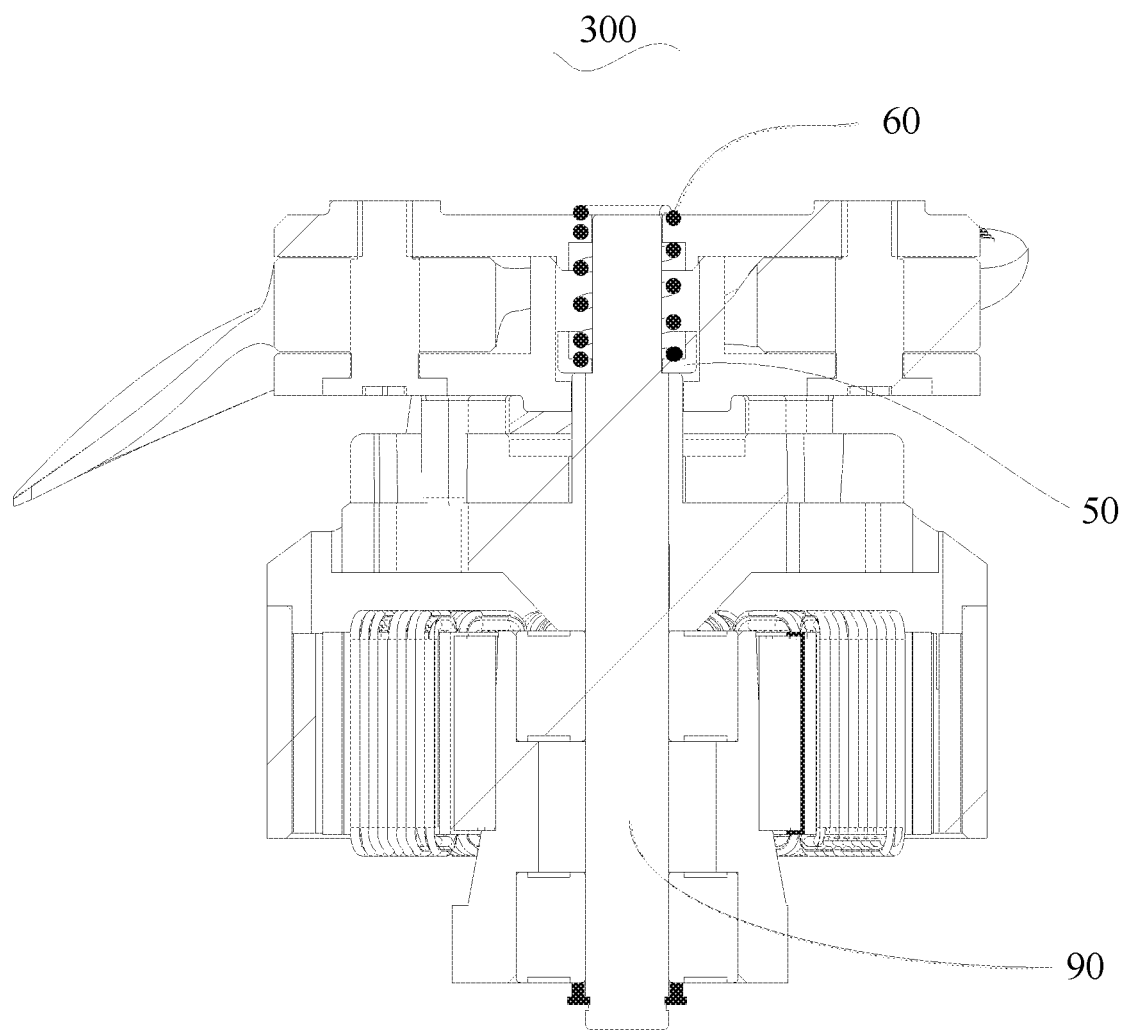
FIG. 8 is a sectional view in a direction of the rotational axis of the first power assembly shown in FIG. 2 in a folded state.

The drive shaft 90 is a stepped shaft and has a step surface 901. As shown in FIG. 8, the drive shaft 90 passes through the central hole of the first mounting member 320 to be connected to the first propeller 310. Both the elastic abutting member 60 and the slide member 50 are sleeved over the drive shaft 90. The slide member 50 is slidable along the drive shaft 90. Because one end of the elastic abutting member 60 abuts the first blade clamp 10, the other end abuts the slide member 50. A surface, away from the first blade clamp 10, of the slide member 50 abuts the step surface 901 of the drive shaft 90. The other end of the elastic abutting member 60 abuts the step surface 901 of the drive shaft 90 by the slide member 50.

During actual application, during the assembly of the first power assembly 300, the first mounting member 320 may be first fixedly mounted on the support surface 801 of the first drive apparatus 330. A fixed mounting manner of the first mounting member 320 may include, but is not limited to, a threaded connection and a fastening connection. Next, the first clamping member 22 of the first propeller 310 is aligned with the end with the large cross-sectional area of the first stroke groove 72 of the first mounting member 320 and is pressed downward, so that the fastening portion 222 of the first clamping member 22 passes through the first stroke groove 72 and enters the first slide groove 81 of the support surface 801. In this case, the elastic abutting member 60 is compressed and deforms elastically. Next, while the downward pressing force is kept, the first propeller 310 is rotated, so that the fastening portion 222 of the first clamping member 22 slides along the first stroke groove 72 toward the end with the small cross-sectional area of the first stroke groove 72 until the fastening portion 222 of the first clamping member 22 slides to a tail end of the first stroke groove 72 (If the second propeller 410 is mounted on the first mounting member 320, because the fitting structure does not match, the second clamping member of the second propeller cannot completely enter the first slide groove 81 of the support surface 801. As a result the fastening portion of the second clamping member cannot slide to the tail end of the first stroke groove 72). In this case, the pressing force on the first propeller 310 may be slowly released to enable the elastic abutting member 60 to recover from the deformation to drive the first propeller 310 along the axial direction of the drive shaft 90 to move away from the first mounting member 320 until the fastening portion 222 is inserted in the clamping groove 74. In this case, the left and right side surfaces of the fastening portion 222 are clamped by the clamping groove 74. The upper surface is stopped by the lower end surface 702 of the first mounting member 320. The elastic abutting member 60 may prevent the fastening portion 222 from moving downward. That is, the fastening portion 222 is completely fixed, so that the first mounting member 320 is fixedly mounted on the first propeller 310.

Conversely, during the disassembly of the first power assembly 300, the first propeller 310 may be first pressed downward, so that the first propeller 310 moves toward the first drive apparatus 330 until the fastening portion 222 of the first clamping member is completely detached from the clamping groove 74. The first propeller 310 is then rotated while the pressing force is kept, so that the first clamping member 22 moves toward the end with the large cross-sectional area of the first stroke groove 72 until the first clamping member 22 moves to the tail end. Next, the first clamping member 22 is removed from the end with the large cross-sectional area of the first stroke groove 72 to separate the first propeller 310 from the first mounting member 320. Finally, if necessary, the first mounting member 320 and the first drive apparatus 330 may further be disassembled to complete the entire disassembly process.

It may be understood that in this embodiment, the second drive apparatus 430 and the first drive apparatus 330 have the same structural features. Therefore, the description of the structural features of the first drive apparatus 330 is also applicable to the second drive apparatus 430. A difference between the second drive apparatus 430 and the first drive apparatus 330 only lies in that the rotational direction of the second drive apparatus 430 is the counterclockwise direction.

Moreover, it may further be understood that the manners of assembling and disassembling the first power assembly 300 are also applicable to the second power assembly 400. Details are not described one by one in this embodiment.

In addition, another embodiment of the present application further provides a propeller kit. The propeller kit includes the foregoing first propeller 310 and second propeller 410.

When a propeller in the foregoing power kit is damaged, the propeller kit provided in this embodiment may be used to replace the propeller in the power kit.

Moreover, it should be understood that the technical features described above in different embodiments can be combined with each other without causing any conflict.

Generally, different from a case in the prior art, the beneficial effects of the embodiments of the present application are as follows: The propeller provided in the embodiments of the present application includes a hub and at least two blades connected to the hub. The hub is detachably mounted on a corresponding drive apparatus by a mounting member corresponding to the hub. A surface, facing the mounting member, of the hub is provided with a first fitting portion. A surface, facing the hub, of the mounting member, is provided with a second fitting portion corresponding to the first fitting portion. The first fitting portion matches the second fitting portion and fitting structures of the first fitting portion and the second fitting portion are separately provided on the propeller and the mounting member corresponding to the propeller, so that first fitting portions and second fitting portions with different shapes and sizes can be conveniently designed for a forward propeller and the mounting member corresponding to the forward propeller and a counter-rotating propeller and the mounting member corresponding to the counter-rotating propeller, the first fitting portion of the forward propeller does not match the second fitting portion of the mounting member corresponding to the counter-rotating propeller and the first fitting portion of the counter-rotating propeller does not match the second fitting portion of the mounting member corresponding to the forward propeller, thereby preventing a user from mounting the forward propeller on the drive apparatus rotating counterclockwise or from mounting the counter-rotating propeller on the drive apparatus rotating clockwise.

It needs to be noted that preferred embodiments of the present application are provided in this specification of the present application and the accompanying drawings. However, the present application may be implemented in various forms and is not limited to the embodiments described in this specification. These embodiments are not used to additionally limit the content of the present application and are provided for more thorough and comprehensive understanding of disclosed content of the present application. In addition, the foregoing technical features can further be combined with each other to form various embodiments that are not listed above. These embodiments are all considered as the scope recorded in this specification of the present application. Further, a person skilled in the art may make improvements or variations to the foregoing description. All these improvements or variations shall fall within the protection scope of the appended claims of the present application.

What is claimed is:

1. A propeller kit, comprising a first propeller and a second propeller, one of the first propeller and the second propeller being a forward propeller, the other being a counter-rotating propeller, wherein
the first propeller comprises a first hub and at least two blades connected to the first hub, the first hub being detachably mounted on a first drive apparatus by a first mounting member, a surface, facing the first mounting member, of the first hub being provided with a first fitting portion, a surface, facing the first hub, of the first mounting member being provided with a second fitting portion corresponding to the first fitting portion, the first fitting portion matching the second fitting portion;
the second propeller comprises a second hub and at least two blades connected to the second hub, the second hub being detachably mounted on a second drive apparatus by a second mounting member, a surface, facing the second mounting member, of the second hub being provided with a third fitting portion, a surface, facing the second hub, of the second mounting member being provided with a fourth fitting portion corresponding to the third fitting portion, the third fitting portion matching the fourth fitting portion; and
the first fitting portion does not match the fourth fitting portion, to prevent the first propeller from being mounted on the second drive apparatus by the second mounting member; and
the third fitting portion does not match the second fitting portion, to prevent the second propeller from being mounted on the first drive apparatus by the first mounting member; and
the first fitting portion is a first boss, the second fitting portion is a first groove, the third fitting portion is a second boss, the fourth fitting portion is a second groove, when the first propeller is mounted on the first drive apparatus, the first boss being inserted in the first groove, when the second propeller is mounted on the second drive apparatus, the second boss being inserted, in the second groove; or
the first fitting portion is a first groove, the second fitting portion is a first boss, the third fitting portion is a second groove and the fourth fitting portion is a second boss, when the first propeller is mounted on the first drive apparatus, the first boss being inserted in the first groove, when the second propeller is mounted on the second drive apparatus, the second boss being inserted in the second groove.

2. The propeller kit according to claim 1, wherein a first clamping member extends from the surface, facing the first mounting member, of the first hub, the first clamping member and the first mounting member being connected by a clamping fit; and
a second clamping member extends from the surface, facing the second mounting member, of the second hub, the second clamping member and the second mounting member being connected by a clamping fit.

3. The propeller kit according to claim 2, wherein when the first clamping member and the first mounting member are connected by the clamping fit, the first boss is inserted in the first groove to reserve a space for the clamping fit between the first clamping member and the first mounting member; and when the second clamping member and the second mounting member are connected by the clamping fit, the second boss is inserted in the second groove to reserve a space for the clamping fit between the second clamping member and the second mounting member; and
when the first clamping member and the second mounting member are connected by the clamping fit, the first fitting portion abuts the fourth fitting portion, to prevent the clamping fit between the first clamping member and the second mounting member; and when the second clamping member and the first mounting member are connected by the clamping fit, the third fitting portion abuts the second fitting portion, to prevent the clamping fit between the second clamping member and the first mounting member.

4. The propeller kit according to claim 1, wherein both a central axis of the first boss and a central axis of the first groove coincide with a rotational axis of the first drive apparatus; and both a central axis of the second boss and a central axis of the second groove coincide with a rotational axis of the second drive apparatus.

5. The propeller kit according to claim 1, wherein
the first boss and the first groove fit in shape and fit in size and the second boss and the second groove fit in shape and fit in size; and
the first boss and the second groove do not fit in shape and do not fit in size and the second boss and the first groove do not fit in shape and do not fit in size.

6. The propeller kit according to claim 1, wherein the cross sections of the first boss, the first groove, the second boss and the second groove are all annular.

7. The propeller kit according to claim 6, wherein
the thickness of the first boss is T1 and the outer diameter is D1; and the depth of the first groove is H1 and the inner diameter is D3; and
the depth of the second boss is T2 and the outer diameter is D2; and the depth of the second groove is H2 and the inner diameter is D4, wherein
T1=H1<T2=H2 and D1=D3>D2=D4; or
T1=H1>T2=H2 and D1=D3<D2=D4.

8. A power kit, comprising: a first drive apparatus, a second drive apparatus, a first mounting member, a second mounting member and a propeller kit comprising a first propeller and a second propeller, one of the first propeller and the second propeller being a forward propeller, the other being a counter-rotating propeller, wherein
the first propeller comprises a first hub and at least two blades connected to the first hub, the first hub being detachably mounted on the first drive apparatus by the first mounting member, a surface, facing the first mounting member, of the first hub being provided with a first fitting portion, a surface, facing the first hub, of the first mounting member being provided with a second fitting portion corresponding to the first fitting portion, the first fitting portion matching the second fitting portion;
the second propeller comprises a second hub and at least two blades connected to the second hub, the second hub being detachably mounted on the second drive apparatus by the second mounting member, a surface, facing the second mounting member, of the second hub being provided with a third fitting portion, a surface, facing the second hub, of the second mounting member being provided with a fourth fitting portion corresponding to the third fitting portion, the third fitting portion matching the fourth fitting portion; and
the first fitting portion does not match the fourth fitting portion, to prevent the first propeller from being mounted on the second drive apparatus by the second mounting member; and
the third fitting portion does not match the second fitting portion, to prevent the second propeller from being mounted on the first drive apparatus by the first mounting member; and
the first fitting portion is a first boss, the second fitting portion is a first groove, the third fitting portion is a second boss, the fourth fitting portion is a second groove, when the first propeller is mounted on the first drive apparatus, the first boss being inserted in the first groove, when the second propeller is mounted on the second drive apparatus, the second boss being inserted in the second groove; or
the first fitting portion is a first groove, the second fitting portion is a first boss, the third fitting portion is a second groove and the fourth fitting portion is a second boss, when the first propeller is mounted on the first drive apparatus, the first boss being inserted in the first groove, when the second propeller is mounted on the second drive apparatus, the second boss being inserted in the second groove;
the first mounting member is fixedly mounted on the first drive apparatus, the first propeller being detachably mounted on the first drive apparatus by the first mounting member;
the second mounting member is fixedly mounted on the second drive apparatus, the second propeller being detachably mounted on the second drive apparatus by the second mounting member; and
in the first drive apparatus and the second drive apparatus, the rotational direction of the drive apparatus corresponding to the forward propeller is the clockwise direction and the rotational direction of the drive apparatus corresponding to the counter-rotating propeller is the counterclockwise direction.

9. The power kit according to claim 8, wherein a first clamping member extends from the surface, facing the first mounting member, of the first hub, the first clamping member and the first mounting member being connected by a clamping fit; and
a second clamping member extends from the surface, facing the second mounting member, of the second hub, the second clamping member and the second mounting member being connected by a clamping fit.

10. The power kit according to claim 9, wherein when the first clamping member and the first mounting member are connected by the clamping fit, the first boss is inserted in the first groove to reserve a space for the clamping fit between the first clamping member and the first mounting member; and when the second clamping member and the second mounting member are connected by the clamping fit, the second boss is inserted in the second groove to reserve a space for the clamping fit between the second clamping member and the second mounting member; and
when the first clamping member and the second mounting member are connected by the clamping fit, the first fitting portion abuts the fourth fitting portion, to prevent the clamping fit between the first clamping member and the second mounting member; and when the second clamping member and the first mounting member are connected by the clamping fit, the third fitting portion abuts the second fitting portion, to prevent the clamping fit between the second clamping member and the first mounting member.

11. The power kit according to claim 8, wherein both a central axis of the first boss and a central axis of the first groove coincide with a rotational axis of the first drive apparatus; and both a central axis of the second boss and a central axis of the second groove coincide with a rotational axis of the second drive apparatus.

12. The power kit according to claim 8, wherein
the first boss and the first groove fit in shape and fit in size and the second boss and the second groove fit in shape and fit in size; and
the first boss and the second groove do not fit in shape and do not fit in size and the second boss and the first groove do not fit in shape and do not fit in size.

13. The power kit according to claim 8, wherein the cross sections of the first boss, the first groove, the second boss and the second groove are all annular.

14. The power kit according to claim 13, wherein
the thickness of the first boss is T1 and the outer diameter is D1; and the depth of the first groove is H1 and the inner diameter is D3; and the depth of the second boss is T2 and the outer diameter is D2; and the depth of the second groove is H2 and the inner diameter is D4, wherein
T1=H1<T2=H2 and D1=D3>D2=D4; or
T1=H1>T2=H2 and D1=D3<D2=D4.

* * * * *